United States Patent
Shimada et al.

(10) Patent No.: US 6,832,299 B2
(45) Date of Patent: Dec. 14, 2004

(54) SYSTEM AND METHOD FOR ASSIGNING STORAGE IN A STORAGE NETWORK IN ACCORDANCE WITH STORED MANAGEMENT INFORMATION

(75) Inventors: Naoki Shimada, Yokohama (JP); Motoaki Hirabayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 656 days.

(21) Appl. No.: 09/811,458

(22) Filed: Mar. 20, 2001

(65) Prior Publication Data

US 2001/0049779 A1 Dec. 6, 2001

(30) Foreign Application Priority Data

Jun. 6, 2000 (JP) ........................................ 2000-174203

(51) Int. Cl.[7] .............................................. G06F 12/00
(52) U.S. Cl. ........................ 711/148; 711/147; 711/170; 711/173
(58) Field of Search ................................ 709/217, 218, 709/226; 711/147, 148, 170, 173

(56) References Cited

U.S. PATENT DOCUMENTS 6,032,224 A * 2/2000 Blumenau ................... 711/117
6,640,278 B1 * 10/2003 Nolan et al. ................. 711/6
6,697,846 B1 * 2/2004 Soltis .......................... 709/217

FOREIGN PATENT DOCUMENTS

| JP | 1091527 | 4/1998 |
|----|---------|--------|
| KR | 95008839 | 8/1995 |
| WO | 0029954 | 5/2000 |

OTHER PUBLICATIONS

Lee et al. "Metadata Management of the SANtopia File System", pp. 492–499. 2001. IEEE.*

* cited by examiner

Primary Examiner—T. Nguyen
(74) Attorney, Agent, or Firm—Antonelli, Terry, Stout & Kraus, LLP (57) ABSTRACT

An assigning system and an assigning method are provided for assigning a storage device or a unitary logical unit of the storage device. A VLU-LU correspondence table is provided which shows a correspondence between virtual logical units (VLU) virtually set in a host computer and logical units (LU) of a plurality of storage devices connected to a network. This table stores evaluation items of each storage device such as a delay time and an access frequency. An evaluation unit calculates an evaluation value of each evaluation item in the table, and a unitary logical unit of the storage is assigned in accordance with the evaluation value.

5 Claims, 11 Drawing Sheets

| VLUN | ABSOLUTE SECTOR NUMBER (MB) | LUN | ABSOLUTE SECTOR NUMBER (MB) | DELAY TIME (ms) | ACCESS FREQUENCY (k/day) | BACKUP FREQUENCY (/year) | VOLUME DUPLICATE WRITE PRESENCE/ABSENCE | EVALUATION VALUE |
|---|---|---|---|---|---|---|---|---|
| 1 | 0– | 1 | 0– | 57 | 324 | 365 | 0 | 923 |
| 1 | 100– | 2 | 100– | 42 | 163 | 365 | 0 | 1186 |
| 1 | 200– | 3 | 0– | 147 | 0 | 52 | 0 | 1036 |
| 2 | 0– | 11 | 200– | 174 | 122 | 52 | 1 | 1216 |
| 2 | 100– | 12 | 100– | 33 | 273 | 52 | 1 | 1337 |
| 0 | 0– | 6 | 0– | 67 | 142 | 52 | 0 | 1079 |
| 0 | 100– | 7 | 100– | 45 | 79 | 365 | 0 | 1569 |
| 0 | 0– | 24 | 0– | 37 | 115 | 52 | 1 | 1243 |

POLICY TABLE 322

| RELIABILITY | ACCESS FREQUENCY | BACKUP FREQUENCY | VOLUME DUPLICATE WRITE PRESENCE/ABSENCE | ESSENTIAL |
|---|---|---|---|---|
| PERFORMANCE | DELAY TIME | | | |
| CONGESTION | ACCESS FREQUENCY | | | |
| CAPACITY | | | | |

FIG.8

VLU-LU CORRESPONDENCE TABLE 320

DISPLAY △ ITEM SETTING

802: VLU NUMBER / VLU ABSOLUTE SECTOR NUMBER / LU NUMBER / LU ABSOLUTE SECTOR NUMBER

801:

| VLUN | ABSOLUTE SECTOR NUMBER (MB) | LUN | ABSOLUTE SECTOR NUMBER (MB) | DELAY TIME (ms) | ACCESS FREQUENCY (k/day) | BACKUP FREQUENCY (/year) | VOLUME DUPLICATE WRITE PRESENCE/ABSENCE | EVALUATION VALUE |
|---|---|---|---|---|---|---|---|---|
| 1 | 0- | 1 | 0- | 57 | 324 | 365 | 0 | 923 |
| 1 | 100- | 2 | 100- | 42 | 163 | 365 | 0 | 1186 |
| 1 | 200- | 3 | 0- | 147 | 0 | 52 | 0 | 1036 |
| 2 | 0- | 11 | 200- | 174 | 122 | 52 | 1 | 1216 |
| 2 | 100- | 12 | 0- | 33 | 273 | 52 | 1 | 1337 |
| 0 | 0- | 6 | 100- | 67 | 142 | 52 | 0 | 1079 |

| MACHINE ID 1302 | ABSOLUTE SECTOR NUMBER (MB) 1303 | LUN 1304 | ABSOLUTE SECTOR NUMBER (MB) 1305 | DELAY TIME (ms) 1306 | ACCESS FREQUENCY (k/day) 1307 | BACKUP FREQUENCY (/year) 1308 | VOLUME DUPLICATE WRITE PRESENCE/ABSENCE 1309 | EVALUATION VALUE 1310 |
|---|---|---|---|---|---|---|---|---|
| 1 | 0- | 1 | 300- | 57 | 324 | 52 | 0 | 923 |
| 1 | 100- | 2 | 100- | 57 | 163 | 365 | 0 | 1216 |
| 1 | 200- | 3 | 200- | 57 | 163 | 365 | 0 | 1216 |
| 2 | 0- | 4 | 300- | 57 | 163 | 365 | 0 | 1216 |
| 2 | 100- | 5 | 400- | 57 | 163 | 365 | 0 | 1216 |
| 0 | 0- | 6 | 200- | 57 | 0 | 52 | 0 | 1379 |
| 0 | 0- | 7 | 300- | 57 | 0 | 52 | 0 | 1379 |

1301

SYSTEM AND METHOD FOR ASSIGNING STORAGE IN A STORAGE NETWORK IN ACCORDANCE WITH STORED MANAGEMENT INFORMATION

BACKGROUND OF THE INVENTION

The present invention relates to assignment of storage devices connected to a network.

JP-A-10-69357 discloses disk controllers connected together by a network. This prior art discloses a mechanism of exchanging a communication protocol between a host and each disk array controller for a communication protocol between disk array controllers, in a storage system connecting a plurality of disk array controllers to a network. With this mechanism, the host has a general interface and communications between disk array controllers can be performed at high speed.

Similarly, JP-A-2000-99272 discloses disk controllers connected together by a network. This prior art discloses on-line addition of a new storage controller to a fabric channel network having a plurality of storage controllers already connected thereto to make the new storage controller take over a process of a logical unit. With this arrangement, loads of the storage controllers can be distributed and process integration can be realized so that a process performance of the whole system can be improved.

In a system connecting host computers and storage devices to a network, each host computer has conventionally used a storage device or logical unit assigned beforehand.

In a storage system connecting a plurality of storage devices to a network, a plurality of host computers connected to the network can access each storage device. Access is also possible between storage devices.

In such systems, the time for a host computer to access each storage device may change with the transmission path of the network. Further, an access frequency and a backup frequency may change with each storage device, and reliability may change with each storage device.

In addition, a host computer may be required to have a fast access time or have high reliability even with a slow access time, depending upon an application program to be used.

SUMMARY OF THE INVENTION

If a storage device or logical unit is assigned in accordance with each application program, a system having a better efficiency can be configured.

It is an object of the present invention to provide a method and system capable of allowing a host computer side to assign each storage device or logical unit.

In order to achieve the above object of the invention, management information for each assignable storage area (unitary logical unit) in a plurality of storages connected to a network is stored. In assigning a logical unit of the storage in response to a user request for a virtual logical unit, an evaluation value of each storage area is calculated in accordance with the management information, and the storage area to be assigned is determined in accordance with the calculated evaluation value.

It is therefore possible to configure a system having a high efficiency capable of assigning each storage device or each storage area.

Other objects, features and advantages of the present invention will become apparent from the following description of the embodiments taken in conjunction with the accompanying drawings.

DETAILED DESCRIPTION OF THE EMBODIMENTS

Embodiments of the invention will be described with reference to the accompanying drawings.

Figure 1:
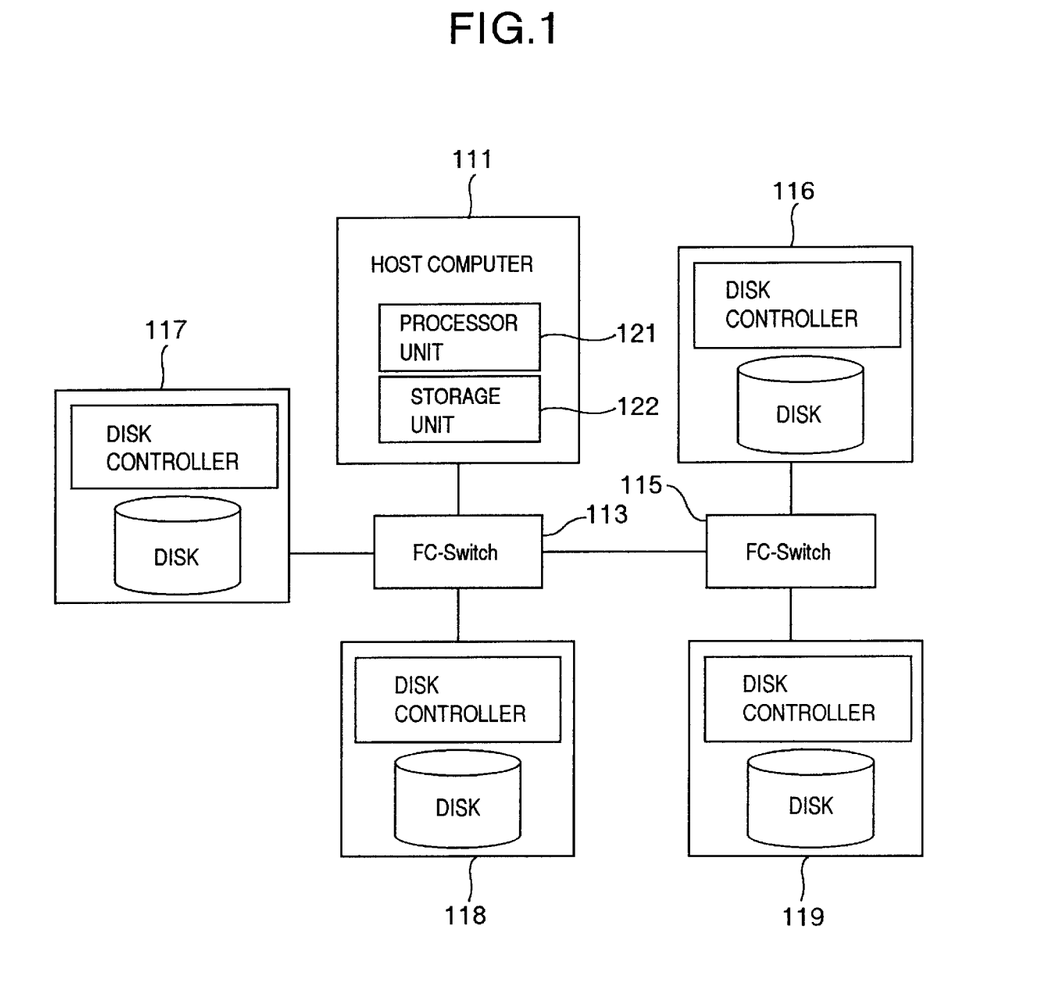
FIG. 1 is a diagram showing the overall structure of a system to which a storage assigning method of this invention is applied.

FIG. 1 is a diagram showing the overall structure of a system to which a storage assigning method of this invention is applied. A host computer 111 is connected via a Fabric Channel Switch (hereinafter called an "FC-Switch") 113 to a plurality of storage devices 117 and 118, and via an FC-Switch 115 to a plurality of storage devices 116 and 119. The storage devices 116, 117, 118 and 119 may be an optical disk device, a magnetic disk device, a magnetic optical disk device, or a magnetic tape. The storage devices 116, 117, 118 and 119 each have a disk and a disk controller.

Figure 2:
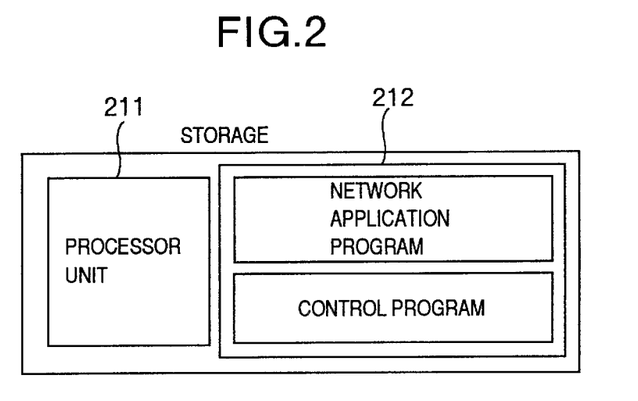
FIG. 2 is a diagram showing the structure of a disk controller.

FIG. 2 shows the structure of the disk controller of the storage device. The disk controller has a processor unit 211 made of a CPU and the like and a storage unit 212 made of a RAM, a ROM and the like. The storage unit 212 stores a network application program for controlling the FC-Switches and network and a control program for the storage device. As the processor unit 211 runs these programs, the FC-Switches 113 and 115 are controlled and data can be transferred directly among the storage devices 116, 117, 118 and 119 without intervention of the host computer 111.

The host computer 111 has a processor unit 121 made of a CPU and the like and a storage unit 122 made of a RAM, a ROM and the like. This host computer 111 may be connected to a computer at a higher hierarchical level via another network.

In this system, when it becomes necessary to access the storage device while an application program is executed, the processor unit 121 of the host computer 111 executes a storage assigning program, determines the storage device satisfying or approximately satisfying the policy (condition) given by a user beforehand, by referring to the contents of a policy table storing the user policy, and can access files and databases in this storage device. For example, if a user gives the host computer 111 a policy (condition) "performance (access speed)", the storage device 117 or 118 is determined via the FC-Switch 113.

Figure 10:
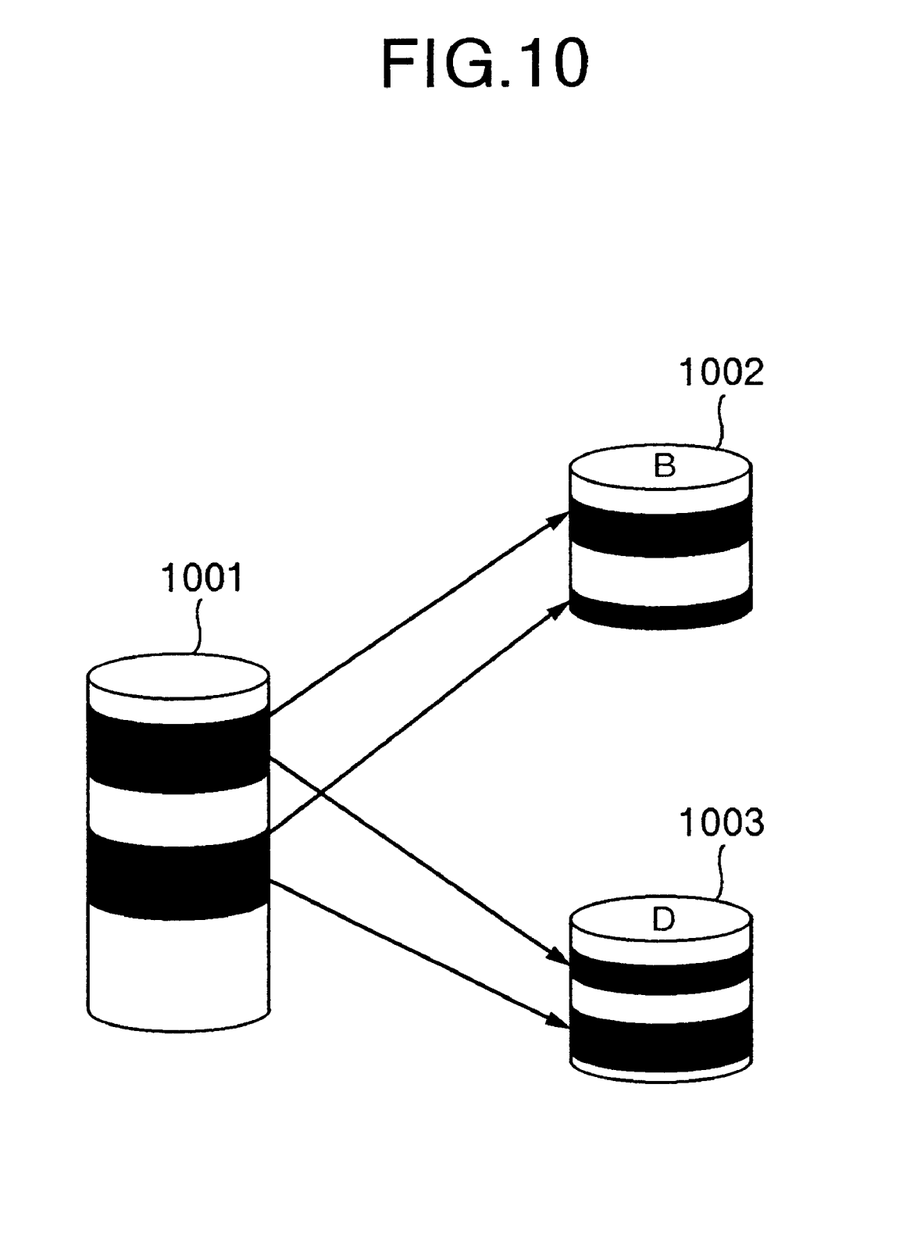
FIG. 10 is a diagram showing a correspondence between virtual logical units and logical units.

In this embodiment, the host computer 111 has virtual storage areas so that the host computer 111 can use the storage devices permitted to be accessed in the network as many as possible. The virtual storage areas of the host computer 111 are managed by giving virtual logical unit numbers (VLUN) to virtual logical units (VLU) corresponding to respective virtual storage areas. The storage area of each disk device is managed by giving logical unit numbers (LUN) to logical units (partitions) (LU) each being provided for a predetermined storage area unit such as a disk unit of each disk device. FIG. 10 shows a correspondence between virtual logical units (VLU) 1001 and logical units (LU). In FIG. 10, logical units (LU) of different storages B 1002 and D 1003 are assigned to two virtual logical units (VLUN) so that it appears as if these units (VLU) have a continuous storage area.

Figure 3:
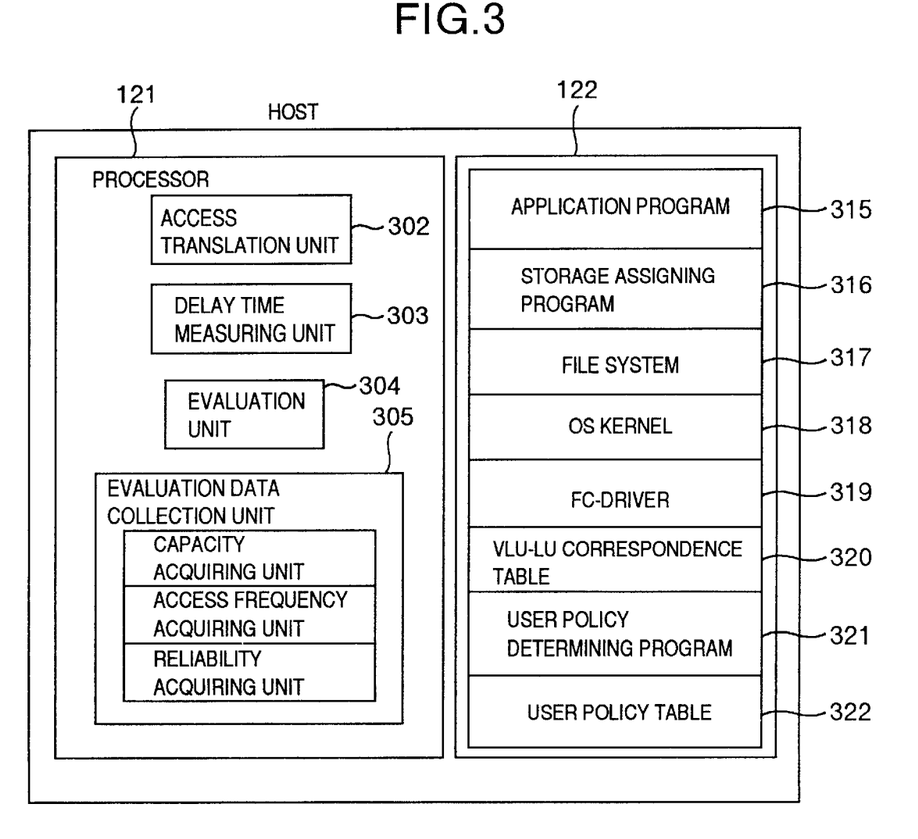
FIG. 3 is a diagram showing the structure of a host computer.

FIG. 3 shows the structure of the host computer 111.

The storage unit 122 of the host computer 111 stores: an application program 315; a storage assigning program 316; a file system 317 for managing files; an OS kernel 318 for memory management and task management; an FC-driver 319 for driving an FC-Switch; a user policy determining program 321 for inputting a user policy; and a policy table 322 for storing the policy determined by the user policy determining program 321. The application program 315, storage assigning program 316 and user policy determining program 321 for inputting a user policy may be stored in advance in the storage unit 122 of the host computer 111, or in a computer readable storage medium such as a magnetic disk. In the latter case, the programs are read from this medium and stored in the storage unit 122 of the host computer 111.

The processor unit 121 is provided with a function of executing the storage assigning program. The processor unit 121 includes: an access translation unit 302 for translating a virtual logical unit number (VLUN) into a logical unit number (LUN); a delay time measuring unit 303 for measuring as a delay time a response time from the host computer 111 to the logical unit (LU) of the storage device; an evaluation unit 304 for determining the logical unit (LU) of the storage device to be accessed by the host computer 111; and an evaluation data collecting unit 305 for collecting the values of evaluation items to be evaluated by the evaluation unit 304.

The evaluation data collecting unit 305 includes: a capacity acquiring unit for measuring an empty capacity of each storage device by using an OS command; an access frequency acquiring unit for acquiring the number of Open/Create/Read/Write commands issued to each storage device; and a reliability acquiring unit for acquiring the number of backed-up times of the storage device by other devices and checking whether or not each storage device has a volume duplicate write function and uses this function.

The reason why the delay time measuring unit 303 and evaluation data collecting unit 305 are separated is to operate the delay time measuring unit 303 in response to a storage assignment request and operate the evaluation data acquiring unit 305 periodically. The delay time can therefore become as more correct information as possible at any given time.

Figure 4:
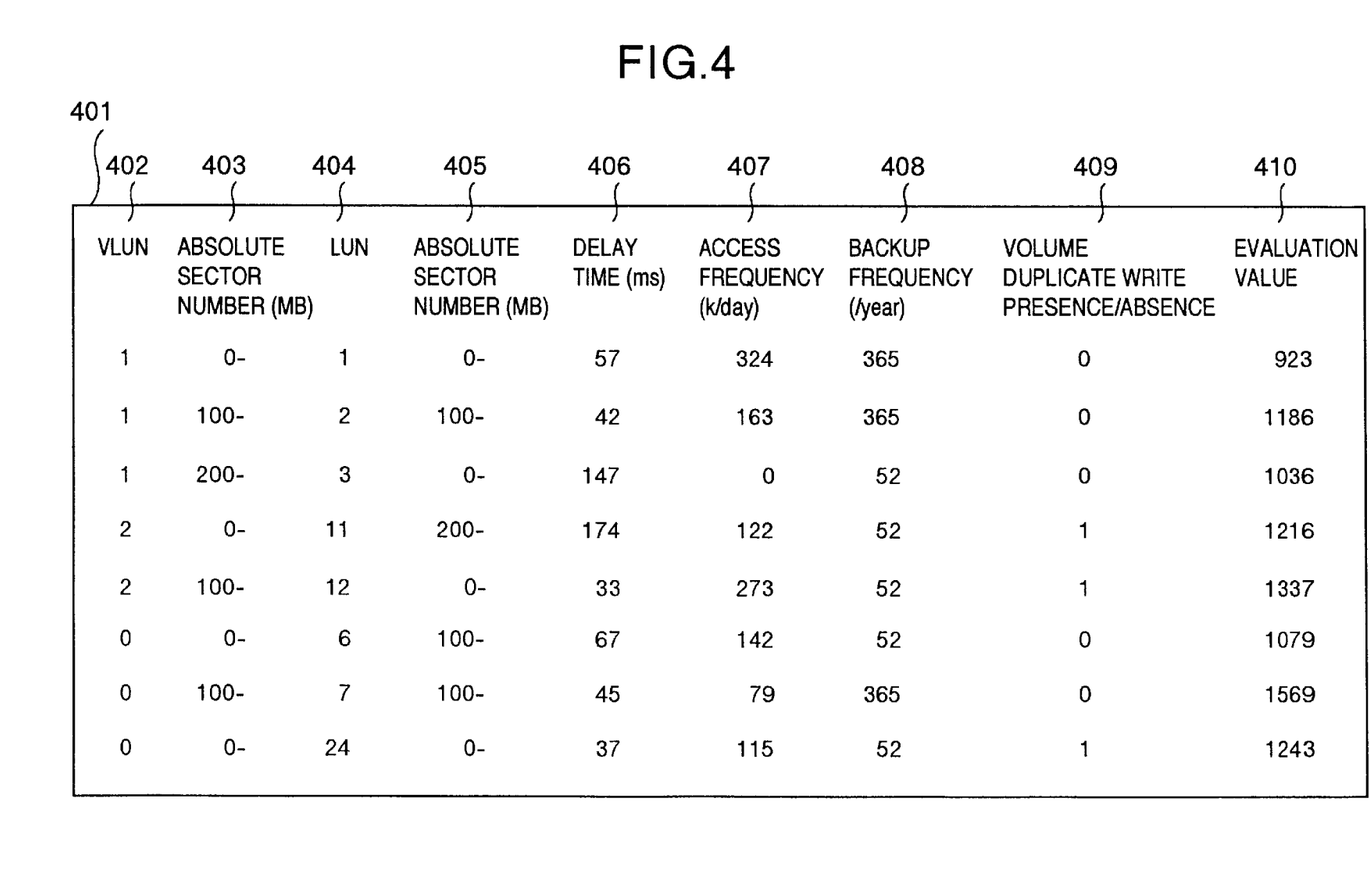
FIG. 4 is a diagram showing an example of a VLU-LU correspondence table.

FIG. 4 shows an example of a VLU-LU correspondence table which is an assignment candidate table. Key items are a virtual logical unit number (VLUN) 402 which is a unique number assigned to each virtual logical unit (VLU) and an absolute sector number 403 representative of a physical position. Similarly, in order to identify the position of the logical unit (LU), a logical unit number (LUN) 404 and an absolute sector number 405 representative of a physical position are provided. If there is no logical unit number (LUN) corresponding to the virtual logical unit number (VLUN), the value of the virtual logical unit number (VLUN) is set to "0". Each absolute sector number is given the same capacity, and the value multiplied by the number of logical units (LU) is the capacity of the virtual logical unit (VLU).

The item of a delay time 406 is updated by the delay time measuring unit 303 when an assignment request is issued to the storage device. A smaller value of the delay time 406 is assumed better unless a user gives a special requirement.

An access frequency 407 is the number of access/write operations of each logical unit (LU) and influences the performance and reliability. If LU is not still used at any given time, the access frequency 407 is "0". A smaller value of the access frequency 407 is also assumed to be better.

A backup frequency 408 is the number of backup operations per year of each logical unit (LU) by other devices. If there is no backup operation, the backup frequency 408 is set to "0". It is judged that the larger this value, the better the reliability.

In order to improve the reliability, the same contents are written in a plurality of volumes depending upon the structure of a storage device. Whether this function is utilized or not is represented by a volume duplicate write presence/absence 409. Obviously, the use of this function is assumed to have a high reliability.

In addition to the above-described evaluation items, other items such as a redundancy degree of disk in a smaller unit and a statistical change in the delay time may be added so that variations of indices to storage assignment become abundant.

An evaluation value 410 is an evaluation value of each logical unit (LU) obtained by the evaluation unit 304. In accordance with this evaluation value, a correspondence between virtual logical units (VLU) and logical units (LU) is determined. If the virtual logical unit number (VLUN) has a positive number, the past evaluation value is retained, whereas if it is "0", the evaluation value at that time is shown. Some of the logical units (LU) having corresponding virtual logical units have smaller evaluation values than those not having corresponding virtual logical units. This phenomenon occurs because the times when the evaluations were made were different or the user policy was changed.

The operations of determining a user policy and assigning a storage device in this system constructed as above will be described.

First, a process of determining a user policy will be described.

Figure 5:
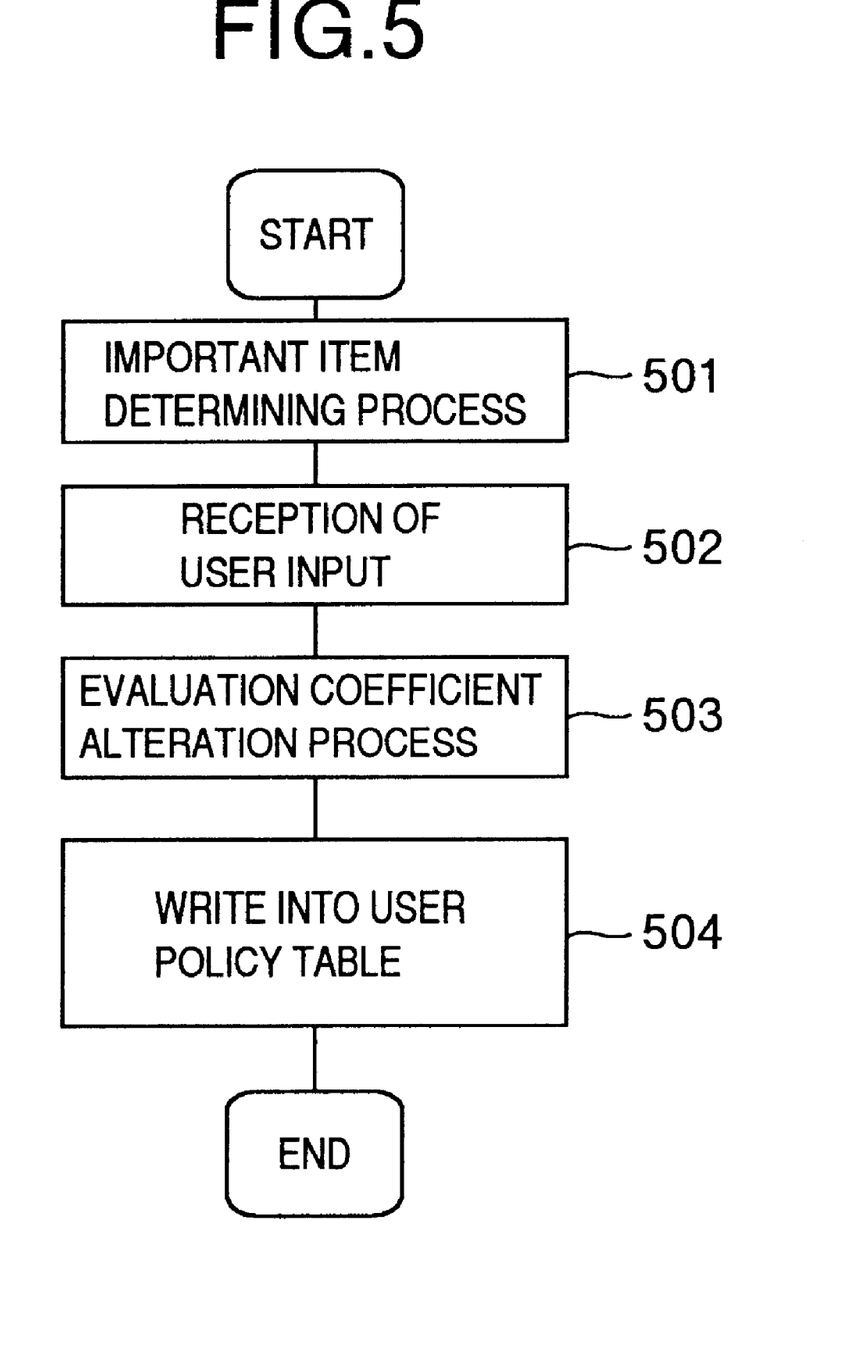
FIG. 5 is a flow chart illustrating a process of determining a user policy.

A user policy is determined when the processor unit 121 executes the user policy determining program 320. FIG. 5 is a flow chart illustrating the process to be executed by the user policy determining program 321.

Figure 6:
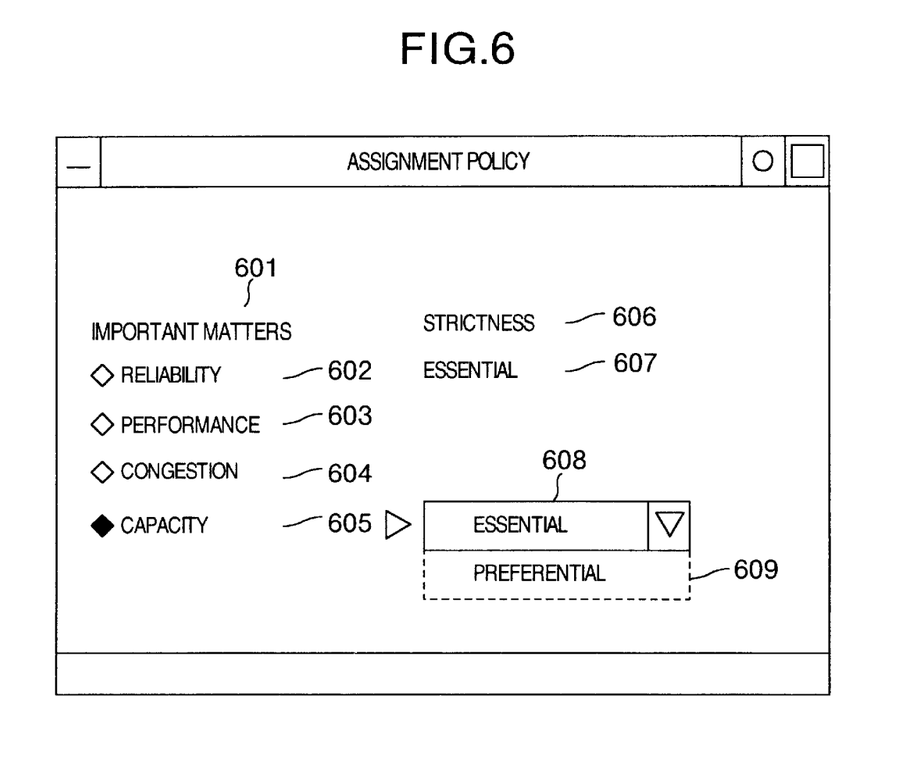
FIG. 6 is a diagram showing an example of displayed contents.

First, each important matter is displayed as a feature obtained by abstracting evaluation items (Step 501). FIG. 6 shows examples of the important matters and inputs of user designation. The user policy determining program 321 receives a user input (Step 502). In this embodiment, as shown in FIG. 6, important matters 601 are displayed as features obtained by abstracting evaluation items, in a menu format, to allow the user to select any important matter. In this example, the user selects reliability and capacity among a menu including reliability 602, performance 603, congestion 604 and capacity 605.

Figure 7:
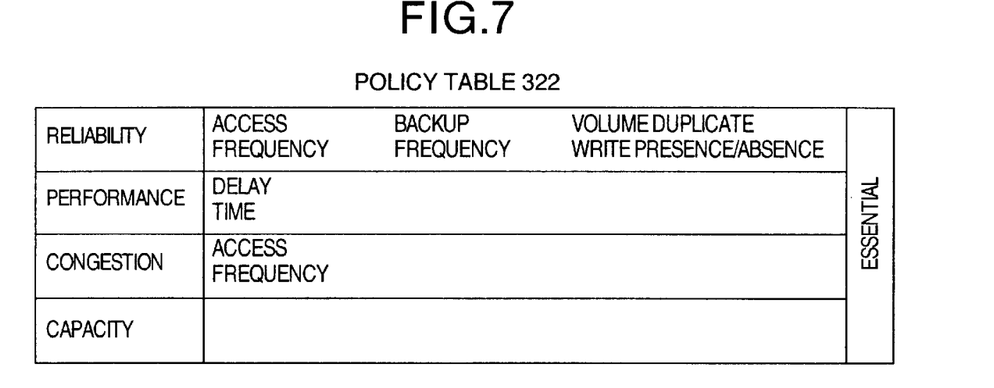
FIG. 7 is a diagram showing a correspondence table between important matters and evaluation items.

The feature representative of each important matter is related to the evaluation items shown in the VLU-LU correspondence table 320 by a table 322 shown in FIG. 7. The contents of the table shown in FIG. 7 can be rewritten by the user.

The important matter selected by the user is either to be strictly obeyed ("essential" 607) or to be satisfied as much as possible ("preferential" 609), by selecting from two items in the menu as represented by strictness 606.

If "preferential" is selected, the evaluation values of all the logical units (LU) not having corresponding virtual logical units (VLU) are obtained, whereas if "essential" is selected, the evaluation values of the logical units which satisfy threshold values are obtained. For example, a logical unit having the threshold values of 52 times/year as the backup frequency and "presence" 1 as the volume duplicate write presence/absence, or the like is selected. The user can designate these threshold values.

In accordance with the important matter selected by the user, an evaluation coefficient of the corresponding evaluation item is altered (Step 503). For example, if the reliability in the important matters 601 displayed with GUI (graphical user interface) is selected, the evaluation coefficient of the access frequency is set to a multiplication of 1.5 and the backup frequency and volume duplicate write presence/absence are set to a multiplication of 2.0.

The evaluation coefficients altered in this manner, "important matters" and "strictness" are written in the user policy table 322 (FIG. 7) (Step 504).

Figure 8:
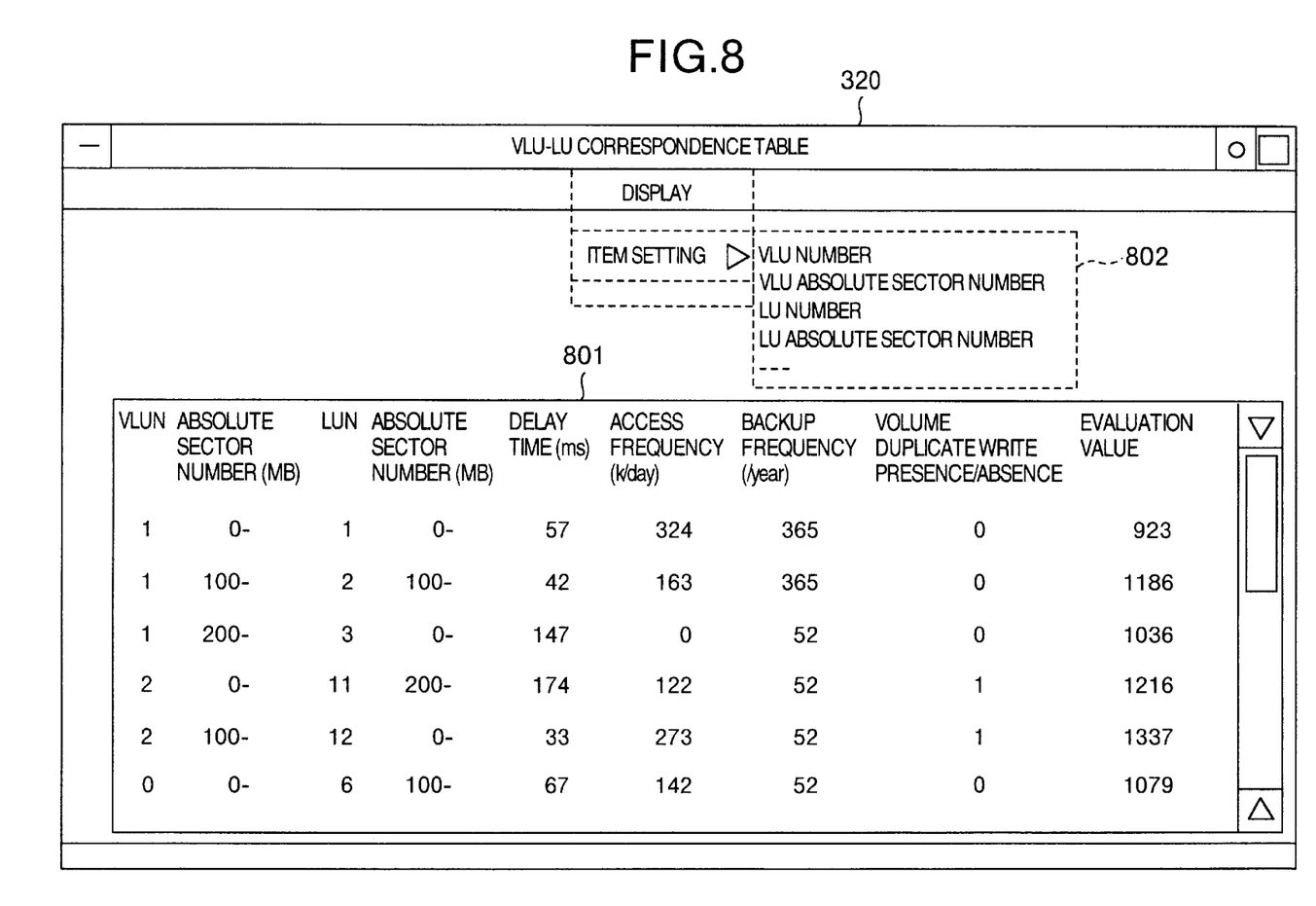
FIG. 8 is a diagram showing an example of displayed contents.

FIG. 8 shows an example of contents displayed when a user refers to the VLU-LU correspondence table 320. While looking at this table, the user determines the important matters 601 and strictness 606 or confirms the current logical units (LU) having and not having corresponding virtual logical units. In a display item setting menu 802, the user can add or delete a display item of the VLU-LU correspondence table. A menu 801 is displayed as a default which displays all items.

Next, a storage assignment process will be described.

A storage is assigned by executing the storage assigning program 316.

Figure 9:
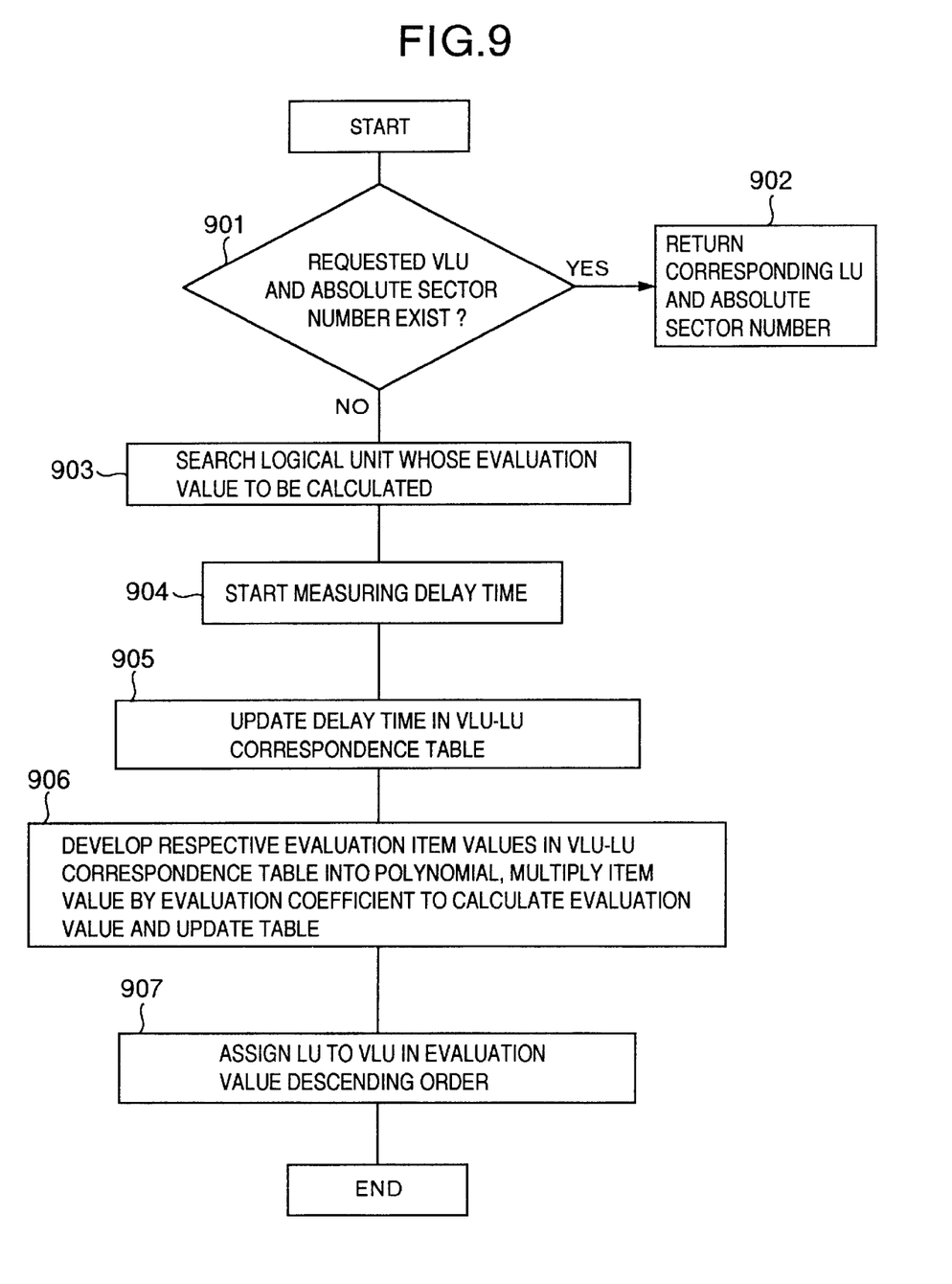
FIG. 9 is a flow chart illustrating a storage assigning process.

FIG. 9 is a flow chart illustrating the process to be executed by a storage assigning program 316.

When a file name is designated and a file Open/Create command is issued after the processor unit 121 of the host computer 111 activates the application program 315, this command is sent to the file system 317. The file system 317 refers to the directory structure and returns a file ID to the application program 315. For a file Read/Write, the application program 315 sends the received file ID and a relative sector number to the file system 317. In accordance with the received file ID and relative sector number, the file system 317 acquires the absolute sector number and sends it together with a drive number contained in the file ID to the OS kernel 318. The OS kernel 318 converts the drive number into a virtual logical unit number (VLUN), activates the storage assigning program 316, and sends the virtual logical unit number and acquired absolute sector number back to the program.

After the storage assigning program 316 is activated, the access conversion unit 302 refers to the VLU-LU correspondence table 320 (Step 901). If the virtual logic unit (VLU) exists in the VLU-LU correspondence table 320, the corresponding logical unit number (LUN) is returned to the program (Step 902), whereas if it does not exist, a new logical unit (LU) is assigned. In this case, the user policy table 322 and VLU-LU correspondence table 320 are referred to to search the logical unit (LU) whose evaluation value is to be calculated (Step 903). In searching the logical unit (LU), if the user policy table 322 has the evaluation item selected as "essential", the logical unit (LU) which satisfies the set threshold value is derived. If all the logical units do not satisfy the threshold value, the process results are displayed as [No logical unit satisfying threshold value. "Preferential" process is executed.], to notify the user of the "preferential" process and change "essential" to "preferential" in the user policy table 322. If another "essential" exists in the user policy table 322, a logical unit (LU) satisfying the threshold value is derived in the manner similar to the above.

If there is no "essential", the logical unit not having a corresponding virtual logical unit (VLU) is derived.

The delay time measuring unit 303 measures the delay time of the derived logical unit (LU) (Step 904). The delay time is measured by starting a timer, issuing a mount request or reference request matching the type of the file system, and measuring the time taken to receive a response.

The result measured by the delay time measuring unit 303 is written in the VLU-LU correspondence table (Step 905).

Next, the evaluation unit 304 reads the evaluation coefficients from the user policy table 322, weights each evaluation item in the VLU-LU correspondence table, and develops each evaluation item value into a polynomial of $S=K1*H1+K2*H2+\ldots$ (S is an evaluation value, Kn is an evaluation coefficient, and Hn is an evaluation item value) (Step 906). The evaluation item value whose smaller value is evaluated better is changed to an inverse value. In order to balance the values of the evaluation items, proper evaluation coefficients are set. For example, the delay time in the unit of millisecond is generally smaller than the other evaluation item values so that the evaluation coefficient of the delay time is set to a multiplication of 2.

After the evaluation values of all the logical units (LU) are calculated, new virtual logical units (VLU) corresponding to the logical units are written in the VLU-LU correspondence table at the virtual logical unit number (VLUN) 402, in the descending order of the evaluation value starting from the largest evaluation value (Step 907).

If a request from the application contains the capacity, the number of logical units (LU) having the same VLUN is increased or decreased.

As described above, according to the embodiment, it is possible to assign the storage device in an optimized manner in accordance with the user assignment policy.

Although not described in this embodiment, an empty capacity of each storage device may be added as the evaluation item of the VLU-LU correspondence table 320. In this case, the logical unit of a storage device having a larger empty capacity can be selected.

If logical units are to be assigned independently for each storage device, the storage assigning program assigns logical units independently to each storage device.

Namely, in this embodiment, by rewriting the evaluation items of the VLU-LU correspondence table (FIG. 8) and the policy table shown in FIG. 7, the storage areas can be assigned in various styles. In a modification of this embodiment, a unit constituted of a program store unit and a processor unit for collecting assignment information and calculating evaluation values is connected to the network such as a fabric channel network. This unit executes Steps 901 to 906 and sends the result data to the processor unit 121 of the host computer 111 whereat Step 907 is executed. Namely, in the host computer, only the process by the evaluation unit 304 is performed. This modification is basically applicable to another embodiment to follow.

The other embodiment of the invention will be described with reference to FIGS. 11 to 14.

Figure 11:
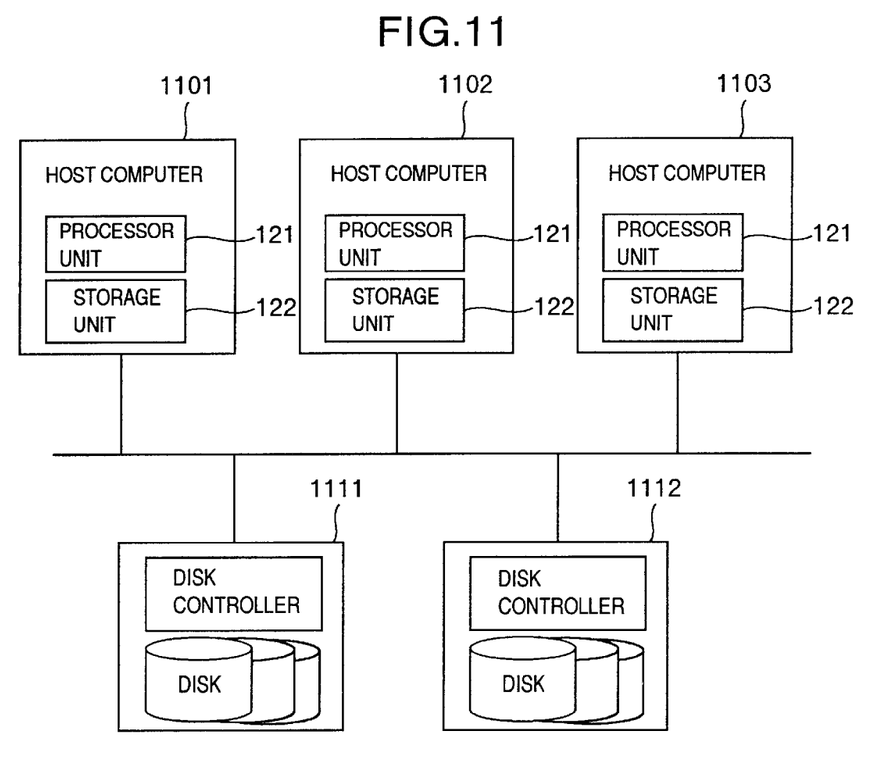
FIG. 11 is a diagram showing the structure of another system embodying the invention.

FIG. 11 is a diagram showing the overall structure of a system of the embodiment to which the storage assigning method of this invention is applied.

The system includes a plurality of host computers 1101, 1102 and 1103 connected to a network and a plurality of storage devices 1111 and 1112 connected to the network. Elements given like reference numerals to those used in FIG. 1 have similar functions described with reference to FIG. 1 (this is also the same in other drawings to follow). Each of the storage device 1111 and 1112 includes a disk controller and a plurality of disk devices. In the first and second embodiments, the network is not limited only to a fabric channel network and a storage area network (SAN), but it may be other networks such as the Internet.

The structure of each of the host computers 1101, 1102 and 1103 is similar to that shown in FIG. 3.

In this embodiment, however, the process contents to be executed by the storage assigning program 316 are different, which will be later detailed.

In this embodiment, the VLU-LU correspondence table 320 may be simpler than that shown in FIG. 4. Specifically, it is sufficient that the table 320 includes at least a virtual logical unit number (VLUN), an absolute sector number of a virtual logical unit, a logical unit number (LUN), and an absolute sector number of a logical unit. As will be later described, the VLU-LU correspondence table stores only a correspondence between virtual logical units (VLU) and logical units (LU).

Figure 12:
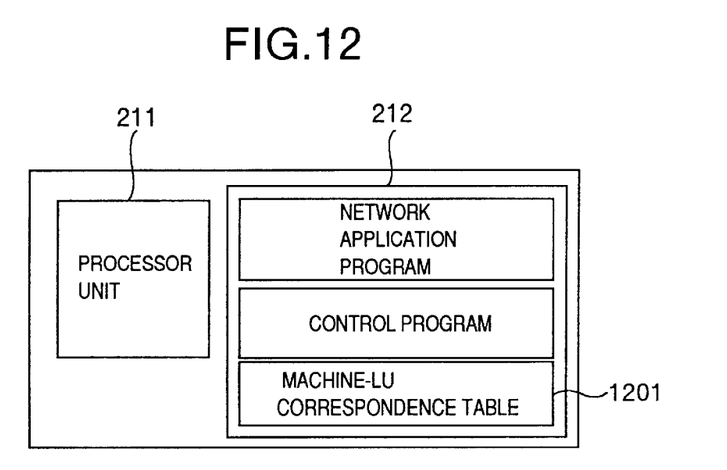
FIG. 12 is a diagram showing the structure of a disk controller.

FIG. 12 shows the structure of the disk controller of each of the storage devices 1111 and 1112. The disk controller has a processor unit 211 made of a CPU and the like and a storage unit 212 made of a RAM, a ROM and the like. The storage unit 212 stores a network application program, a control program, and a machine-LU correspondence table 1201.

Figure 13:
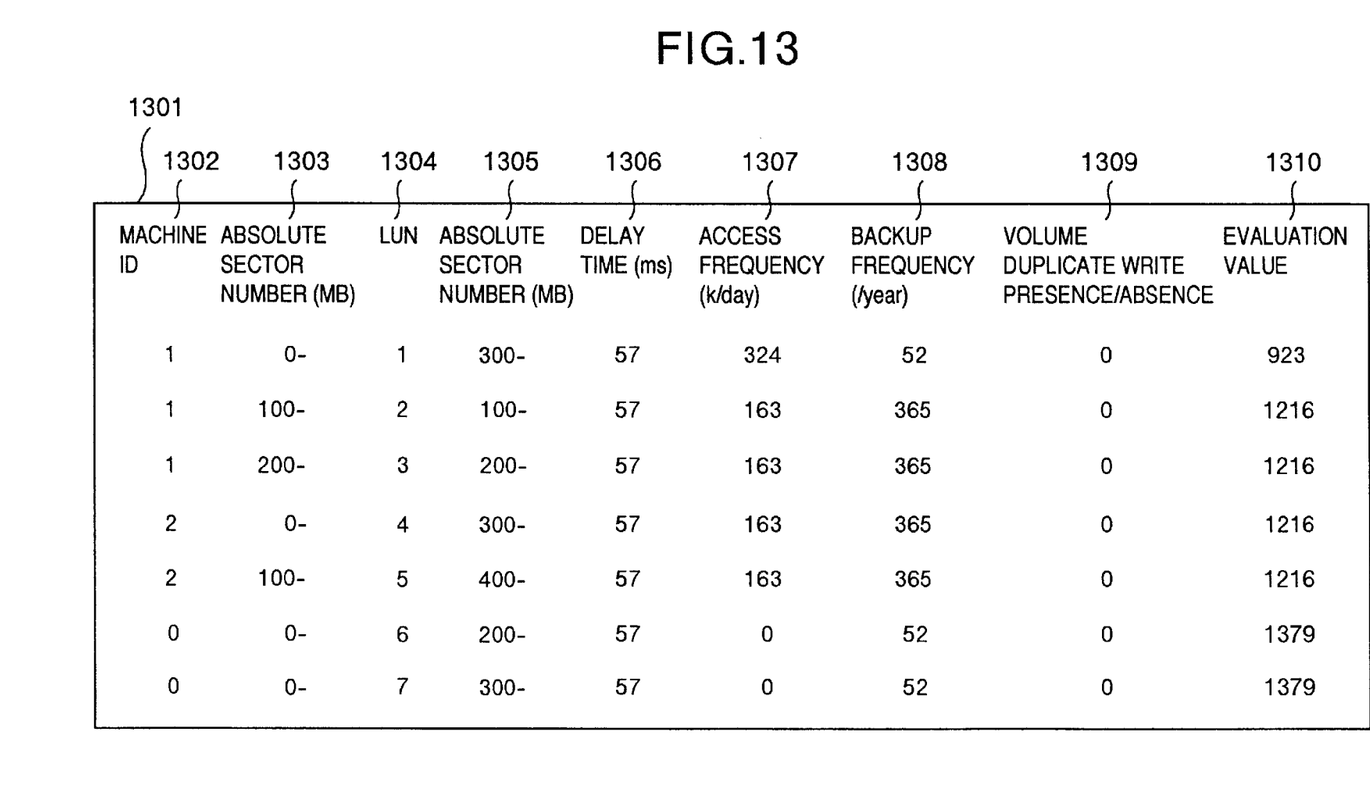
FIG. 13 is a diagram showing an example of a machine-LU correspondence table.

FIG. 13 shows an example of the machine-LU correspondence table 1201. Key items of the machine-LU correspondence table are a machine identifier (ID) 1302 for identifying each host computer and an absolute sector number 1303 representative of a physical position. Similarly, in order to identify the position of a logical unit (LU), a logical unit number (LUN) 1304 and an absolute sector number 1305 representative of a physical position are provided. If there is no logical unit number (LUN) corresponding to the machine ID, the value of the machine ID is set to "0". Each absolute sector number is given the same capacity, and the value multiplied by the number of logical units (LU) is the capacity of the virtual logical unit (VLU) of the host computer.

The item of a delay time 1306 is updated by the delay time measuring unit 303 when an assignment request is issued to the storage device.

An access frequency 1307 is the number of access/write operations of each logical unit (LU) and influences the performance and reliability. If LU is not still used at any given time, the access frequency is set to "0".

A backup frequency 1308 is the number of backup operations per year of each logical unit (LU) by other devices. If there is no backup operation, the backup frequency 1308 is "0". In order to improve the reliability, the same contents are written in a plurality of volumes depending upon the structure of a storage device. Whether this function is utilized or not is represented by a volume duplicate write presence/absence item 1309.

In addition to the above-described evaluation items, other items such as a redundancy degree of disk in a smaller unit and a statistical change in the delay time may be added so that variations of indices to storage assignment become abundant. As the evaluation items, other evaluation items may be added such as a charge of using an assigned logical unit.

An evaluation value 1310 is an evaluation value of each logical unit (LU) obtained by the evaluation unit 304. In accordance with this evaluation value, a correspondence between host computers and logical units (LU) is determined. If the machine ID has a positive number, the past evaluation value is retained, whereas if it is "0", the evaluation value at that time is shown. Some of the logical units (LU) having corresponding virtual logical units have smaller evaluation values than those not having corresponding virtual logical units. This phenomenon occurs because the times when the evaluations were made were different or the user policy was changed.

Next, a storage assignment process to be executed by the host computer will be described. A user policy is determined by a process similar to that described with reference to FIG. 5.

A storage device assigning process is performed in the similar manner by each of the host computers. The storage device assigning process to be executed, for example, by the host computer 1101 will be described.

Figure 14:
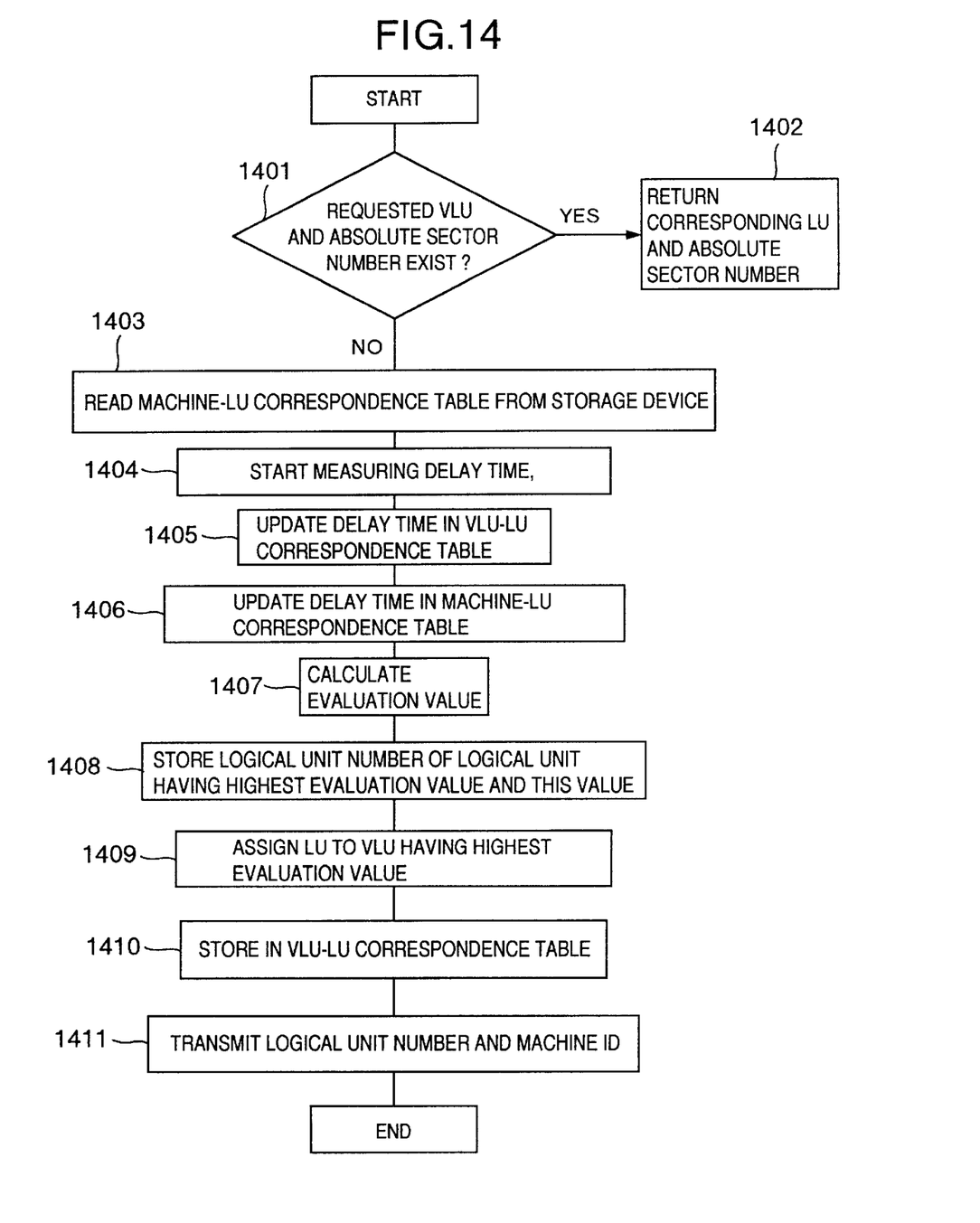
FIG. 14 is a flow chart illustrating a storage assigning process.

FIG. 14 is a flow chart illustrating the process to be executed by a storage assigning program.

When a file name is designated and a file Open/Create command is issued after the processor unit 121 of the host computer 1101 activates the application program 315, this command is sent to the file system 317. The file system 317 refers to the directory structure and returns a file ID to the application program 315. For a file Read/Write operation, the application program 315 sends the received file ID and a relative sector number to the file system 317. In accordance with the received file ID and relative sector number, the file system 317 acquires the absolute sector number and sends it together with a drive number contained in the file ID to the OS kernel 318. The OS kernel 318 converts the drive number into a virtual logical unit number (VLUN), activates the storage assigning program 316, and sends the virtual logical unit number and acquired absolute sector number to the program.

After the storage assigning program 316 is activated, the access conversion unit 302 refers to the VLU-LU correspondence table (Step 1401). If the virtual logic unit (VLU) exists in the VLU-LU correspondence table, the corresponding logical unit number (LUN) is returned to the program (step 1402), whereas if it does not exist, a new logical unit (LU) is assigned. In this case, this process is performed independently for each storage device.

First, an exclusive access privilege for the storage device 1111 is acquired to read the machine-LU correspondence table (Step 1403). Next, the user policy table is referred to to search the logical unit (LU) whose evaluation value is to be calculated (Step 1404). In searching the logical unit (LU), if the user policy table has the evaluation item selected as "essential", the logical unit (LU) which satisfies the set threshold value is derived. If all the logical units do not satisfy the threshold value, the process results are displayed as [No logical unit satisfying threshold value. "Preferential" process is executed.], to notify the user of the "preferential" process and change "essential" to "preferential" in the user policy table. If another "essential" exists in the user policy table, a logical unit (LU) satisfying the threshold value is derived in the manner similar to the above.

If there is no "essential", the logical unit not having a corresponding virtual logical unit (VLU) is derived.

Next, the delay time measuring unit 303 measures the delay time of the derived logical unit (LU) (Step 1405). The delay time is measured in the manner described earlier.

The result measured by the delay time measuring unit 303 at Step 1405 is written in the machine-LU correspondence table (FIG. 13) (Step 1406).

Next, the evaluation unit 304 reads the evaluation coefficients from the user policy table, weights each evaluation item in the machine-LU correspondence table, and develops each evaluation item value into a polynomial of S=K1*H1+ K2*H2+ . . . (S is an evaluation value, Kn is an evaluation coefficient, and Hn is an evaluation item value) (Step 1407).

After the evaluation values of all the logical units (LU) are calculated, the logical unit number of the logical unit having a highest evaluation value and this value are stored (Step 1408).

Next, the exclusive access privilege for the storage device 1112 is acquired to execute the processes at Steps 1403 to 1408 described above.

After the logical unit number of the logical unit having the highest evaluation value is derived from each storage device, the logical unit having the highest evaluation value among the derived logical unit numbers is related to the virtual logical unit of the host computer 1101 (Step 1409).

The virtual logical unit number (VLUN) of the related logical unit, an absolute sector number of the virtual logical unit, a logical unit number (LUN) and an absolute sector number of the logical unit are stored in the VLU-LU correspondence table (Step 1410). The logical unit number and the machine ID of the host computer 1111 are transmitted to the storage device having the related logical unit (Step 1411). Upon reception of the logical unit number and machine ID of the host computer 1111, the processor unit of the storage device writes the machine ID in the corresponding field of the machine-LU correspondence table.

If a request from the application contains the capacity, the number of logical units (LU) having the same machine ID is increased or decreased.

As described above, according to the embodiment, it is possible to assign the storage device in accordance with the user assignment policy. Since the machine-LU correspondence table is provided on the storage side and is used exclusively by the machines, assignment contention on the same storage can be avoided.

According to the invention, it is possible to finely assign a storage device or storage area and improve the system efficiency.

What is claimed is:

1. A storage assigning method of assigning at least a predetermined store area among a plurality of storages connected to a network to a computer connected to the network, said method comprising the steps of:

collecting information regarding assignable predetermined store areas among the storages;

calculating an evaluation value of each of said assignable predetermined store areas in accordance with the collected information; and determining the predetermined store area to be assigned in accordance with the calculated evaluation value, wherein the information of the store areas includes at least an access frequency, a capacity, a delay time and/or charge information, respectively of the storage having the predetermined store areas.

2. An information processing system including a host computer and a plurality of storages connected to a network, the host computer comprises:

a store unit for storing information of store areas in the storages; and a processor unit for calculating an evaluation value of each of the store areas and determining a predetermined store area to be assigned, in accordance with the evaluation value, through execution of an application program, wherein the information of the store areas includes at least an access frequency, a capacity, a delay time and charge information, respectively of the storage having the predetermined store areas.

3. An information processing system including a plurality of host computers and storages connected to a network, wherein:

each of the storages comprises a store unit storing information regarding predetermined store areas of the storage;

each of the host computers includes a processor unit for selecting one of the plurality of storages, calculating an evaluation value of each of the store areas in accordance with the information regarding the predetermined store areas stored in the store unit of the selected storage, and determining a predetermined store area to be assigned, in accordance with the calculated evaluation value, through execution of an application program, and the information of the store areas includes at least one of an access frequency, a capacity, a delay time and charge information, respectively of the storage having the predetermined store areas.

4. An apparatus for supplying information of storage assignment for assigning a predetermined store area in a plurality of storages connected to a network to a computer connected to the network, the apparatus comprising:

means for collecting information of assignable store areas of each storage;

means for calculating an evaluation value of each of the store areas in accordance with the collected information collected by said collecting means; and means for outputting evaluation value information so as to determine the predetermined store area to be assigned in accordance with information of the evaluation value calculated by said calculating means, wherein the information of the store areas includes at least a desired one of items including an access frequency, a capacity, a delay time and charge information, respectively of the storage having the predetermined store areas.

5. An information processing system including a plurality of host computers and storages connected to a network for storage assignment under a condition of different inter-node transmission performances, wherein:

each of the storages comprises store means for storing information regarding predetermined store areas of the storage;

each of the host computers or an assignment information managing apparatus provided on the network includes means for sequentially selecting one of the plurality of storages, and generating an evaluation value table by calculating an evaluation value of each of the store areas in accordance with the information of the storage areas stored in said store means of the selected storage, and processing means for determining a predetermined store area to be assigned, in accordance with contents of the evaluation value table, through execution of an application program; and the information of the store areas includes at least a desired one of items including an access frequency, a capacity, a delay time and charge information, respectively of the storage having the predetermined store areas, the evaluation value table includes the items, and the assignment information managing apparatus writes the evaluation values matching a request from an assignment requesting side in the evaluation value table.

* * * * *